United States Patent
Spisak et al.

[11] Patent Number: 6,096,365
[45] Date of Patent: *Aug. 1, 2000

[54] BEVERAGE INTERMEDIATE AND METHOD FOR COEXTRACTING TEA LEAVES AND OTHER VEGETABLE MATERIAL

[75] Inventors: Martin John Spisak, Parlin; Gregg Lance Lehmberg, Somerset, both of N.J.

[73] Assignee: Thomas J. Lipton Co., Division of Conopco, Inc., Englewood Cliffs, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/561,645

[22] Filed: Nov. 22, 1995

[51] Int. Cl.$^7$ .............................. A23F 3/00; A23F 3/34; A23L 1/28; A23L 1/223
[52] U.S. Cl. .................... 426/597; 426/425; 426/435; 426/422; 426/638
[58] Field of Search ..................... 426/597, 435, 426/425, 638, 422

[56] References Cited

U.S. PATENT DOCUMENTS 4,357,361 11/1982 Lunder et al. .

OTHER PUBLICATIONS

Database Abstact. WPIDS. AN:94–023838 taken from SU 1784167 published Dec. 30, 1992. Authors: Baramidze et al.

*Primary Examiner*—Anthony J. Weier
*Attorney, Agent, or Firm*—James J. Farrell

[57] ABSTRACT

A process for the preparation of a black tea extract which includes blending black tea leaves with water which contains another acidic vegetable material, extracting at 70° to 100° F. for a time sufficient to achieve good contact of the tea leaves with the water, afterwards separating the aqueous extract from the solid material and clarifying the extract. The extract may then be used to prepare a final product having good acid stability, good clarity and good color over the shelf life of the product.

1 Claim, No Drawings

BEVERAGE INTERMEDIATE AND METHOD FOR COEXTRACTING TEA LEAVES AND OTHER VEGETABLE MATERIAL

FIELD OF THE INVENTION

The present invention relates to an improved process for the preparation of a soluble tea extract which when formulated into a finished beverage has improved acid stability, good clarity and consistent color over the shelf life of the product.

BACKGROUND OF THE INVENTION

During the production of tea extracts, certain substances are extracted from the tea leaves which are insoluble in cold water and result in a cloudy formation when the extract is added to cold water. Although these substances may be removed by cooling the hot aqueous tea extract to precipitate them, there is a loss of up to about 30% of the total tea solids if the precipitated portion is then discarded, thus leading to a substantial loss of normal flavoring and color components. In addition, selected vegetable components may be added to tea to produce various effects, taste and the like. In one instance hibiscus flower extract is added to improve clarity and in U.S. Pat. No. 4,357,361, hibiscus or other vegetable materials are employed to improve the solubility of the powder by first extracting the vegetable material and then using this extract in a further extraction of black tea.

It has now been found that by employing a co-extraction of a blend of the tea leaves and selected vegetable material at the same time rather than in series that in addition to the improved solubility sought by the prior art, the beverage prepared from such co-extraction has better acid stability, is clearer and has a more stable color over the shelf life of the product. While not wishing to be bound thereby, It is theorized that the co-extraction with the hibiscus or indeed any acidic herb results in an extraction at relatively acid pH. When the resulting extract is polished acid insolubles are removed thus resulting is improved clarity and acid stability in the finished beverage. In addition, the pH of the co-extract is about 4.0 which reduces the risk of microorganism growth during processing.

Accordingly, the present invention provides a process for the preparation of a tea beverage or a black tea extract which comprises contacting black tea leaves blended with a second vegetable material with water which has been preheated to 70° F. to 140° F., maintaining at this temperature for a time sufficient to achieve good contact of the leaf blend with the water, afterwards separating the aqueous extract from the solid material and either preparing a ready-to-drink beverage or drying the aqueous extract.

SUMMARY OF THE INVENTION

The process of this invention is applicable to any kind of black tea or to any blend thereof such as teas obtained from Argentina, China, India, Kenya and the like.

The vegetable material, which is used to blend with the black tea, is a herb tea, especially one normally associated with tea in instant drinks, for example, Hibiscus flowers, Rosehips, Peppermint and Orange blossoms.

Preferably Hibiscus is employed. The Hibiscus flowers to be used are the dried calyces of Hibiscus Sabdariffa (Fam. Malvaceae). Chinese origin flowers are preferable. Once the flowers are selected they must pass the following test:

Extraction & Filtration:
1. Determine the solids content of the filtrate by drying.
2. Add 20.0 grams Hibiscus flowers to the heated, agitating water for exactly five minutes.
3. Using a Buchner funnel (vacuum filtration) set-up, and a qualitative (11 micron) filter paper, i.e., Whatman #1 filter the extract solution and record the weight of the filtrate.

Dilution & Color Measurement:
1. Determine the solids content of the filtrate by drying.
2. Prepare 200.0 grams of diluted filtrate solution by doing the following:
   (a) Divide 0.96 by the measured percent solids to determine the quantity of filtrate needed for dilution. (For example, if the percent solids =4.00%; 0.96÷0.0400= 24.0 grams of filtrate).
   (b) Add the determined quantity of filtrate to a clean 400 ml beaker and add water to bring the total net weight to 200.0 grams. Stir the diluted filtrate solution for 15 seconds.
3. Using a properly calibrated Hunter Colorimeter DP-9000, measure the L, a, and haze of the diluted filtrate solution utilizing a 5 cm cell.

The Hibiscus Flowers will be considered within specification if the L, a, and haze as measured or a Hunterlab DP900 or equivalent instrument fall into the following ranges:

| | |
|---|---|
| L value | 20.00–26.00 |
| a value | 45.00–55.00 |
| haze | 15.00 max. |

Hibiscus extract is currently commercially available as a solution in ethyl alcohol and as a dried powder.

The amount of vegetable material used for the blend is conveniently from 5% to 15% by weight and preferably from 8% to 12% by weight based on the weight of the black tea used for the extraction. A color similar to the color of natural tea is obtained by remaining in the 8% to 12% range although the other benefits of the invention can be obtained outside of these ranges.

The period of time of the extraction of the vegetable material and tea is conveniently at least 5 minutes and preferably from 10 to 40 minutes. Longer periods of time are possible but are usually unnecessary. The extraction may be conveniently carried out by methods known to the art.

The blend is extracted at about 70° F. to 140° F. for about 5 to 10 minutes either with a single pass or multiple passes.

The aqueous extract is then separated from the solids by any convenient means such as filtration, centrifugation and the like.

If desired the aqueous extract may be used to prepare ready-to-drink tea or may be concentrated to a suitable solids content and/or may be dried. The powdered extract may be obtained by freeze-drying or spray-drying.

The extract may be mixed with any of the ingredients usually employed in tea preparations, for instance, sucrose, glucose, citric acid, tartaric acid, sodium citrate, flavors or anti-caking agents. If desired, volatiles may be removed from the black tea leaves before extraction, for example, by steam distillation and afterwards reincorporated into the extract.

The extract obtained in accordance with the present invention provides beverages having good clarity and acid stability, palatability and drinking qualities and a consistent color over the shelf life of the product.

Having generally described various aspects of the present invention, the invention will now be more particularly described with reference to the following specific examples.

EXAMPLE 1

10 g of Hibiscus flowers and 80 grams of black tea are added to 1000 ml of water at 70° F. and stirred for 30 minutes at 70° F. Afterwards the mixture is filtered and the extract is formulated into a finished beverage. The final beverage obtained has good acid stability and maintains its color and clarity.

EXAMPLE 2

By following a similar procedure to that described in Example 1 but using 5 g of Hibiscus flowers and 60 g of black tea, a beverage is obtained which has good acid stability, color and clarity.

EXAMPLE 3

By following a similar procedure to that described in Example 1 but in which the blend is stirred in the water for 15 minutes instead of 30 minutes, a beverage is obtained which has good acid stability and color and clarity.

EXAMPLE 4

A tea-based, lemon-flavored, sweetened ready-to-drink beverage is manufactured as follows: Water (90.9 parts) at 115° F. contacts a pre-blended charge of selected tea leaves (8.3 parts) and hibiscus flowers (0.8 parts) on a parts by weight basis in an extraction vessel. The extract was filtered, centrifuged and pasteurized. To an agitated mix vessel 83.5 parts water, 11.0 parts sweetener, 5.0 parts extract, 0.25 parts anhydrous citric acid and 0.25 parts flavors were added. After mild agitation for 10 minutes the blend was pasteurized and hot filled into a beverage container. The beverage mix is characterized as a clear, reddish-brown liquid having good acid stability, color and clarity. This beverage is used in the comparison below as Example 4.

EXAMPLE 5 (COMPARATIVE)

A ready-to-drink tea based beverage is prepared as follows:

9.1 parts of a select blend of tea leaves is contacted with 90.1 parts of water at 115° F. in an extraction vessel. The extract is filtered and centrifuged. The extract is then mixed with 2 parts of a commercial alcohol based extract of hibiscus flowers containing about 44% to 48% solids in an agitated mix vessel containing 83.5 parts by weight of water, 11.0 parts sweetener, 5.0 parts extract, 0.25 parts citric acid and 0.25 parts flavors. The mixture was agitated for about 10 minutes and the blend was pasteurized and filled into beverage containers. The beverage is a reddish-brown liquid and is used as Example 5 in the following comparison.

The tea blends of Examples 4 and 5 are compared for their color and haze according to Hunter Colorimetry on a Hunterlab DP 900.

|      | EXAMPLE 4 | EXAMPLE 5 |
| ---- | --------- | --------- |
| L    | 57.79     | 47.07     |
| a    | 28.97     | 27.45     |
| haze | 7.60      | 14.05     |

The samples are aged for six months and again tested with the following results:

|      | EXAMPLE 4 | EXAMPLE 5 |
| ---- | --------- | --------- |
| L    | 36.14     | 20.1      |
| a    | 22.64     | 19.77     |
| haze | 25.68     | 42.44     |

It should be understood that the specific forms of the invention herein illustrated and described are intended to be representative only. Changes, including but not limited to those suggested in this specification, may be made in the illustrated embodiments without departing from the clear teachings of the disclosure. Accordingly, reference should be made to the following appended claims in determining the full scope of the invention.

What is claimed is:

1. A powdered black tea extract product which has good acid stability and consistent color and clarity over the shelf life of the product prepared by a process consisting essentially of:

(a) blending selected amounts of black tea and hibiscus flowers at a ratio of about 8 to 12 parts of the black tea to about 1 part of the hibiscus flowers to form a leaf blend;

(b) contacting the blend with about 5 to 30 parts of water to 1 part of blend at about 70° F. to 140° F. for at least 5 minutes to form a co-extracted infusion;

(c) separating the co-extracted infusion from the blend;

(d) clarifying the co-extracted infusion; and (e) drying the co-extracted infusion to produce the powdered black tea extract.

* * * * *